(12) United States Patent
Holzer

(10) Patent No.: US 6,754,966 B2
(45) Date of Patent: Jun. 29, 2004

(54) WIENIE ROASTER

(76) Inventor: Robert Charles Holzer, CMS Manufacturing 1169 Shriver Rd., Orofino, ID (US) 83544

(*) Notice: Subject to any disclaimer, the term of this patent is extended or adjusted under 35 U.S.C. 154(b) by 77 days.

(21) Appl. No.: 10/116,439

(22) Filed: Apr. 3, 2002

(65) Prior Publication Data

US 2003/0188438 A1 Oct. 9, 2003

(51) Int. Cl.$^7$ ................................................. A47J 43/28
(52) U.S. Cl. ........................................................ 30/322
(58) Field of Search .......................... 30/322, 323, 340; 294/53.5; 7/112; 177/653; 99/419, 421 A, 421 H

(56) References Cited

U.S. PATENT DOCUMENTS

| | | | |
|---|---|---|---|
| 4,446,777 A | * 5/1984 | Grigorenko | .................. 99/419 |
| 4,517,885 A | 5/1985 | Thompson | |
| 4,982,657 A | 1/1991 | Ghenic | |
| 5,117,558 A | 6/1992 | Hull | |
| 5,355,778 A | 10/1994 | Mayfield et al. | |
| 5,628,244 A | 5/1997 | Holliday | |
| 5,775,207 A | 7/1998 | Warren | |
| D411,083 S | 6/1999 | Clark et al. | |

OTHER PUBLICATIONS printout of inventor's website showing previous invention Rolla Roaster (www.rollaroaster.com).

Solutions Catalog, Spring 2002, p. 58, showing "Original Weenie Roaster" (not invented by inventor).

* cited by examiner

Primary Examiner—Douglas D. Watts
(74) Attorney, Agent, or Firm—Duncan Palmatier

(57) ABSTRACT

Disclosed is a wienie roaster with prongs that may be folded back. The prongs are pivotly received by a head, and the head is attached at the end of a roaster stalk. The prong has a continuous curve as it enters the head which produces friction to hold the prongs at an adjustable angle away from or towards the roaster stalk. The bore in the head may have beveled, oval-shaped openings, so that the curved base of the prong notches into place in extended and folded back positions. The roaster may also have a tension shoe for applying and distributing pressure on the prongs and a notch in the prongs for receiving the tension shoe. A hole in the top of the head allows lubricant, such as oil or fat from cooking food, to enter the head and lubricate the base of the prong and the tension shoe. The lubrication hole may also be threaded to receive a set screw, which can provide additional pressure to hold the prong in place. In an another alternative embodiment, the base of the prong has notches to receive the tip of the roaster stalk. In this embodiment, the prong is held in its extended and folded back positions when the tip of the stalk enters the notches in the base of the prong. The end of the stalk may be threaded to receive the head, so that the head can be screwed out a little to allow the base of the prong to clear the tip of the stalk, thereby permitting the prong to be swivelled to its extended or folded position. Alternatively, a spring and ball at the end of the stalk can exert enough pressure to hold the ball in the notches of the prong base to hold the prong in position, yet still allow the prong to be swivelled.

13 Claims, 3 Drawing Sheets

WIENIE ROASTER

BACKGROUND OF THE INVENTION

1. Field of Invention

This device relates to culinary tools. More particularly, the present invention relates to a safe, easy, and compact transportable roasting device with foldable prongs.

2. Description of Prior Art

Who does not love a hot dog or marshmallow roasted over a campfire? Ancient in this art is a tree branch to hold food over a fire far enough out so that the holder's hands are not singed. The branch has given way to the relatively more high tech ROLLA ROASTER (Trademark), as shown in FIG. 1: twin prong tines 1 at the end of a telescoping stalk 2, a handle 3, and a knob 4 that allows the stalk to be rotated from the handle end. However, when the prior art ROLLA ROASTER stalk 2 is fully collapsed, the roaster is still almost a foot long, making it difficult to pack and carry. Also, the prongs 1 can poke holes in bags, back packs, or pockets, which is a nuisance and a danger to the user. Needed is a wienie roaster with prongs that can be easily moved out of the way.

SUMMARY OF THE INVENTION

Disclosed here is a wienie roaster with a compact, simple, and safe means to fold the prongs. This keeps the prongs out of the way when the roaster is being carried, so that it will not jab and stick holes in people and things. The folding prong design disclosed here makes for a more compact, safer, and easier to carry and store wienie roaster. Further objects and advantages by this invention will become apparent from the following description, and from the preferred embodiments shown in the accompanying drawings and description.

A basic embodiment of the invention discloses a head at the end of a roaster stalk, which has a bore that pivotably receives a prong. Friction between the prong and the head folds the prong in its extended operational position and also allows the prong to be swivelled and folded back. According to the most preferred embodiment disclosed here, the prong is formed of wire in a U-shape, curved at the base. The base of the "U" is pivotably received by a head, and the head is secured at the end of the roaster stalk. The base of the U-shaped prong is not squared off, but has a slight curve. The prong is made of a resilient material, such as steel, which allows some give and bend, but springs back into its original shape. The bore in the head for receiving the base of the prong has oval-shaped, beveled openings. The vertices of the oval openings are directed toward and away from the roaster's handle or stalk so that the curved base of the resilient prong notches into place in the extended and folded back positions. A tension shoe within the head distributes even pressure on the base of the prong. A hole in the top of the head allows lubricant, such as oil or fat from a cooking wiener, to enter the head and lubricate the base of the prong and the tension shoe. The lubrication hole may also be threaded to receive a set screw, which can provide additional pressure to hold the prong in place.

In another embodiment of the disclosed invention, the base of the U-shaped prong has a beveled bore forming notches to receive the tip of the roaster stalk. In this embodiment, the prong is held in its extended and folded back positions when the tip of the stalk enters the notches in the base of the prong. The end of the stalk may be threaded to receive the head, so that the head can be screwed out a little to allow the base of the prong to clear the tip of the stalk, thereby permitting the prong to be swivelled to its extended or folded position. Alternatively, a spring and ball at the end of the stalk can exert enough pressure to hold the ball in the notches of the prong base to hold the prong in position, yet still allow the prong to be swivelled.

DETAILED DESCRIPTION OF THE INVENTION

The Applicant here uses the generic term "wienie roaster" as an over-arching description of the invention disclosed and claimed here. However, it is expressly intended that the term "wienie roaster" be understood to encompass a roaster for any food, not just wieners. Thus, by way of just one example, the claimed wienie roaster includes roasters used for cooking marshmallows. To those skilled in the art—that is, to anyone who can roast food over a campfire—it will be immediately apparent that the invention may be used to roast almost any food item over a fire, not just wieners.

Figure 1:
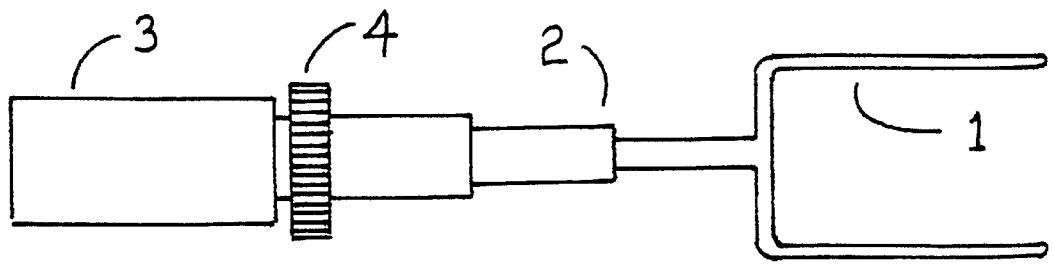
FIG. 1 is a side view of a prior art wienie roaster.
Figure 2:
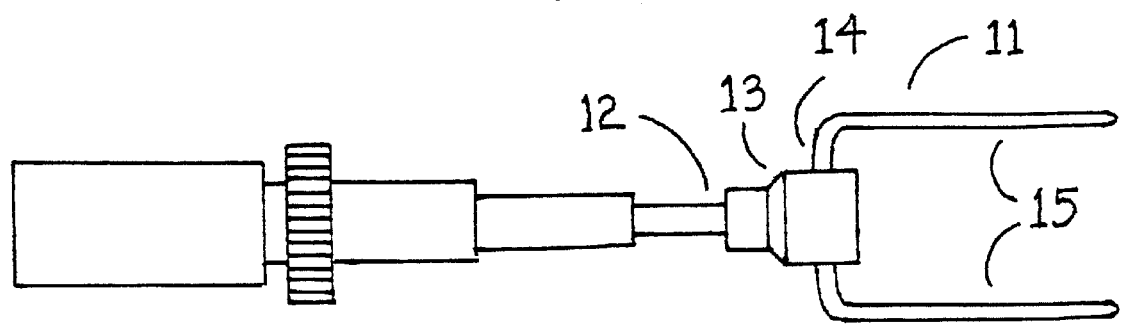
FIG. 2 is a side view of the invention.
Figure 3:
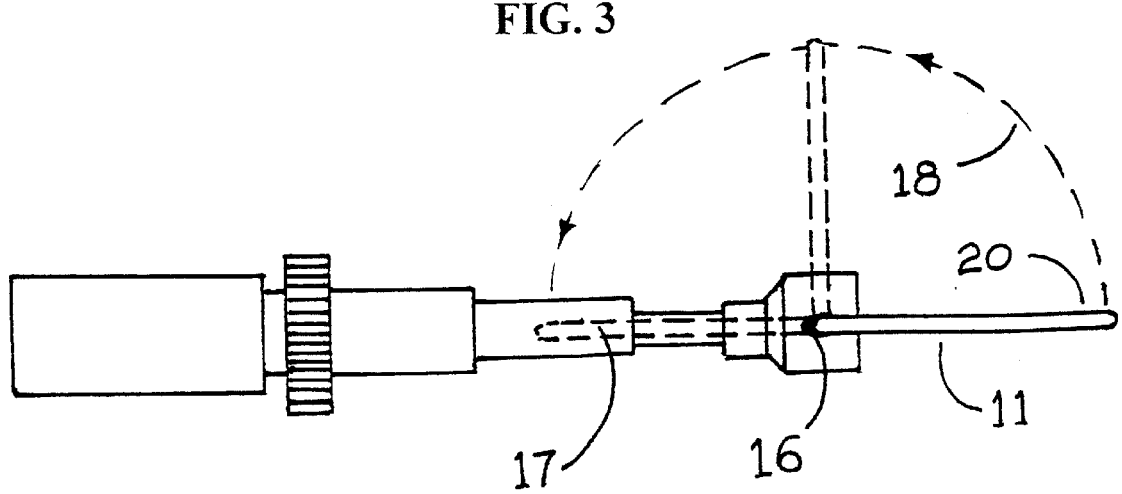
FIG. 3 is a side view of a preferred embodiment of the invention, showing the prongs arcing and swivelling back into the folded position.

FIG. 2 shows a basic embodiment of the invention. A head 13, at the end of a roaster stalk 12, pivotably holds a curved base 14 of a prong 11 having twin tines 15. As shown in FIG. 3, the prong 11 may pivot through an arc 18, so that it can swing from an extended position 20 back into a folded position 17. The arc 18 shown in FIG. 3 is 180°, but it will be appreciated that the prong 11 can pivot through a complete 360° arc. The prong 11 is made of a resilient material, such as steel, so that the base of the prong will give and bend out a little, as the prong 11 is pivoted within the confines of an oval-shaped opening 16 between the extended 20 and folded 17 positions, and will spring back to its original shape, and notch or snap into place, in the beveled seat of the oval-shaped opening 16 in the fully extended or folded positions.

Figure 4:
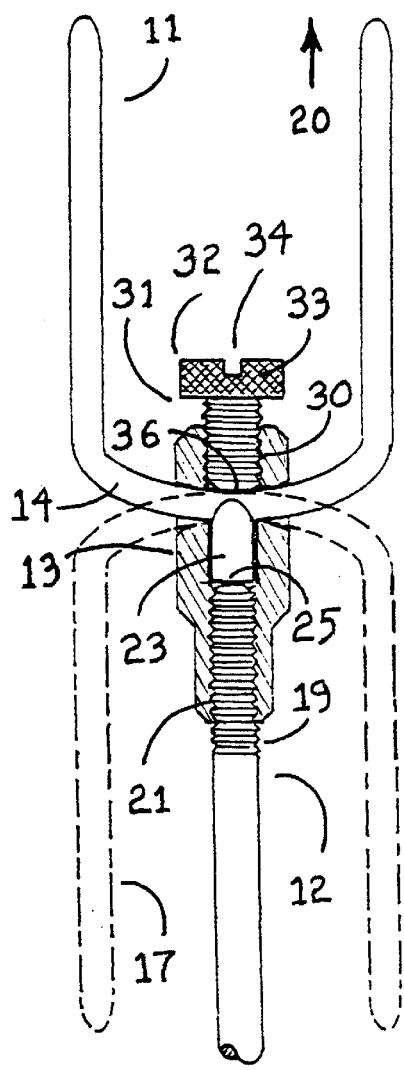
FIG. 4 is a cross-section side view of the head of a preferred embodiment of the invention.
Figure 5:
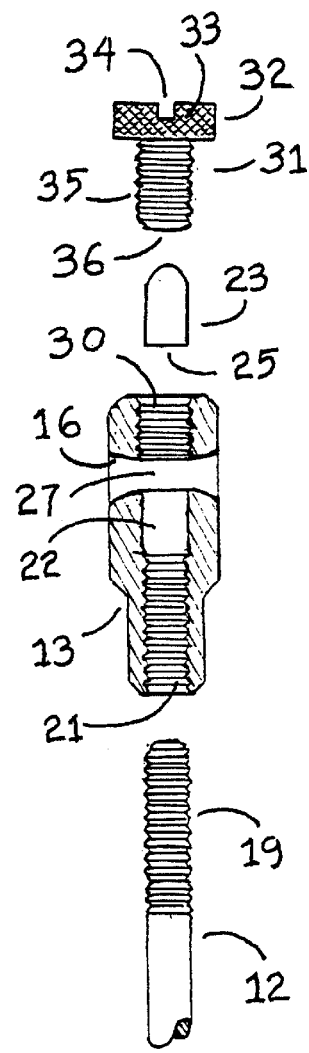
FIG. 5 is a cross-section and exploded side view of the parts of the head of the preferred embodiment of the invention.
Figure 6:
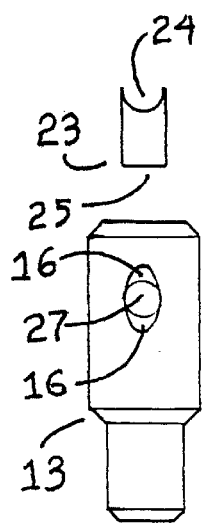
FIG. 6 is an exploded side view of the head of the preferred embodiment of the invention.

FIGS. 4 and 5 show cross-section side views of the head of a preferred embodiment of the invention. A head (shown in outline form by the figure shaded in hatch pattern) 13 at the end of a roaster stalk 12, pivotably holds a curved base 14 of a prong 11. The prong 11 may pivot through a 180° arc so that it can swing from an extended position, as indicated by 20, back into a folded position, as indicated in ghost lines at 17. As described above in the basic embodiment, the prong 11 is made of a resilient material, such as steel, so that the curved base 14 will give and bend out a little, as the prong 11 is pivoted within the confines of an beveled, oval-shaped opening 16 between the extended 20 and folded 17 positions, and spring back to its original position when the prong 11 is swivelled into the vertices of the oval-shaped opening 16. A tension shoe 23, having a base 25 atop the tip of the stalk 12, is located within the head 13. FIG. 6 shows the shoe contact 24 opposite the base 25. The shoe contact 24 rides against the prong base 14. The stalk 12 has a threaded stalk end 19 used to attach the stalk to the head and exert pressure against the base 25 of the tension shoe 23. A shaft bore 21 in the head, which has threads and diameter matching a threaded end 19 of the stalk 12, extends from the bottom of the head, proximal to the stalk 12, to the tension shoe cavity 22 inside of the head. Thus, by turning the head 13 on the threads 19 of the stalk 12, the pressure exerted by the contact surface 24 of the tension shoe 23 on the base 14 of the prong 11 can be increased or decreased. A hole 30 in the top of the head allows lubricant, such as oil or fat from a cooking wiener, to enter the head and lubricate the base of the prong 14 and the tension shoe 23.

FIG. 5 shows a cross-section of the head 13 in the preferred embodiment and an exploded view of the various roaster parts located therein. The head 13 is attached onto the threaded stalk end 19 by screwing the threaded stalk end 19 to a threaded shaft bore 21 in the head. The head 13 contains a prong bore 27 for pivotably receiving the prong base (14 in FIG. 4). The opening 16 to the prong bore 27 is beveled in an oval-shape. The vertices of the oval opening 16 are directed toward and away from the stalk 12 so that the curved base 14 of the resilient prong 11 notches or snaps into place in the extended and folded back positions (indicated by 20 and 17). At the base of the prong bore 27, proximal the threaded stalk end 19 and shaft bore 21, a tension shoe cavity 22 contains a the tension shoe 23. The tension shoe base 25 touches the stalk end 19 and the shoe contact (24 in FIG. 6) rides adjacent to the prong in the prong bore 27. The tension shoe 23 may be inserted into the shoe cavity 22 through the lubrication hole 30 in the top of the head 13, or, if the tension shoe 23 is small enough, through the shaft bore 21.

FIG. 6 shows an exploded side view of the head of the preferred embodiment of the invention. The head 13 contains the prong bore 27 which pivotably holds the prong. The mouth 16 of the prong bore 27 has a beveled oval-shaped opening 16 with the vertices of the oval opening 16 directed so that the curved base of the resilient prong base (14 in FIG. 4) notches or snaps into place in the extended and folded back positions. The tension shoe 23 contains a shoe contact surface 24 shaped so that it has approximately the same circumference as the prong base (14 in FIG. 4).

To manufacture the preferred embodiment described above, the prong 11 is formed in three steps. First, one bend is formed in a resilient material, such as steel, resulting in an L-shape. The bend must be shaped to form part of the prong's curved base 14. Second, the base of the "L" is inserted into the prong bore 27. Third, the second bend is formed to create the resulting prong 11 with the curved base 14. It will be appreciated by those skilled in the art that the disclosed invention may made with any number of tines (15 in FIG. 2), from a single tine to three or more tines, although twin tines 15 are the most simple and effective and useful design.

To operate the tension shoe device shown in the preferred embodiment in FIGS. 4 through 6, the prong 11 is swivelled into the vertices of the oval-shaped prong bore opening 16. The threaded stalk end 19 and the threaded stalk bore 21 in the head 13 are screwed together until the threaded stalk end 19 presses against the base 25 of the tension shoe 23, within the shoe cavity 22, which in turn causes the shoe contact 24 to press against the base of the prong 14 inside the prong cavity 27 until the desired degree of stiffness and support of the prong is achieved.

Although not necessary for the operation of the preferred embodiment of the invention, FIGS. 4 through 6 also show an alternative embodiment of the invention employing a set screw to supply additional force to the prong. As shown in FIGS. 4 and 5, the lubrication hole 30 in the head 13 is threaded to receive a set screw 31. The screw head 32 of the screw 31 may have knurling 33, allowing the screw to be tightened or loosened with fingers. A slot 34 in the screw head 32 allows for additional tightening through use of a mechanical device, such as a screwdriver. It will be appreciated that any type of screw, such as an allen head screw, would also work. To operate the set screw device, the prong is swivelled to its extended (11 in FIG. 4) or folded back 17 position, and the screw 31 is turned by either finger action, using the knurling 33 on the screw head 32, or with a screwdriver or other such mechanical device by inserting the screwdriver head into the slot 34 on the screw head 32. The screw 31 is turned until the screw end 36 contacts the prong in the prong bore 27 and produces the desired degree of stiffness and support against the prong.

Figure 7:
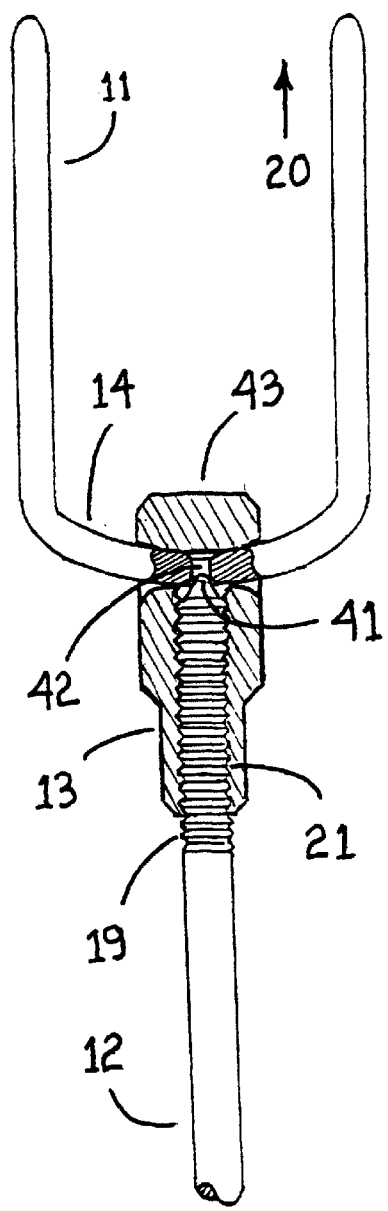
FIG. 7 is a cross-section side view of an alternative embodiment of the invention.

FIG. 7 shows another embodiment of the invention. As in the other embodiments, a head 13 at the end of a roaster stalk 12, pivotably holds a prong 11. The tip of the stalk 12 is shaped, preferably in the shape of a dull point, to form a latch 41. The base of the prong 14 inside the head has a beveled hole forming notches 42 and 57 to receive the latch 41. The shaft has a threaded stalk end 19, used to screw the shaft 12 onto the head. A shaft bore 21 in the head, which has threads and diameter matching the threaded shaft end 19, extends from the bottom of the head, opposite the head top 43, to the notch 42 in the prong base 14 inside of the head. In this embodiment, the prong may be held in its extended position 20 when the latch 41 enters the notch 42 in the base of the prong 14. Or, the prong is held in its folded back position (17, as seen in FIG. 4) when the latch 41 enters the notch 57 in the base of the prong 14. The head can be screwed out a little by turning it on the threads 19 of the stalk 12 and shaft hole 21 to allow the notches 42 and 57 in the base of the prong 14 to clear the latch 41 at the tip of the stalk 12, thereby permitting the prong 11 to be swivelled to its extended or folded position. FIG. 7 shows a preferred embodiment with a U-shaped prong 11 having a curved base 14, so that the prong 11 will snap into place in the extended and folded back positions, as described above. However, it will be appreciated that this additional feature is not necessary and the base of the prong could be straight (51 in FIG. 8) and the bore (55 in FIG. 8) to receive the prong 11 could also be straight.

Figure 8:
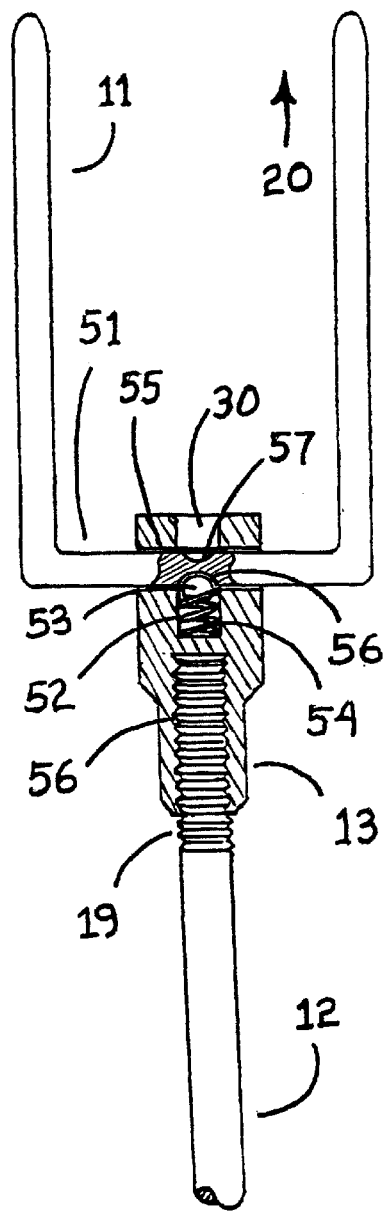
FIG. 8 is a cross-section side view of another alternative embodiment of the invention.

FIG. 8 shows another embodiment of the invention. FIG. 8 shows a prong with a base that is straightened 51 as it enters the head 13 through a straight bore 55. A threaded shaft 56 in the head 13 is receives the threaded end 19 of stalk 12. A cavity 54 within the head 13 holds a spring 52 and ball 53. The ball 53 contacts the compressed spring 52 within the cavity 54, and the compressed spring 52 presses the ball 53 against the base 51 of the prong 11. The base 51 of the prong 11 has a notch 56 located to receive a portion of the ball 53 when the prong 11 is in the extended position 17. In this embodiment, the compressed spring 52 and ball 53 exert enough pressure to hold the ball 53 in the notch 56 of the prong base 51 and hold the prong 11 in an extended position 17. Another notch 57 in the base 51 of the prong 11, opposite notch 56, is placed to hold the prong 11 in the folded back position (17 in FIG. 2). Yet when sufficient pressure is exerted on the prong 11, the ball 53 pushes against the spring 52, and the spring 52 further compresses, allowing the ball 53 to disengage from the notch 56 in the prong base 51. This permits the prong 11 to be swivelled to its extended 20 or folded back 17 position.

While the present roaster has been described herein with reference to particular embodiments as described above, a latitude of modification, various changes, and substitutions are intended in the foregoing disclosure. It will be appreciated that in certain instances some features of the invention will be employed without a corresponding use of other features without departing from the scope of the invention. While the above description contains many specific embodiments, these should not be construed as limitations on the scope of invention. Accordingly, the scope of invention should be determined by the claims set forth herein and their equivalents.

What I claim is:

1. A wienie roaster comprising:

a stalk with an end, a head attached to the end of the stalk, a bore through the head, a prong, for securing a food item, pivotably received in the bore in the head, a cavity in the head communicating with the bore, and a latch in the cavity fo engage the prong.

2. The wienie roaster of claim 1, wherein the head further comprises:

a top, located at the distal end of the head from the stalk, and a hole, opening at the top, and communicating with the bore, and the hole is threaded to receive a screw.

3. The wienie roaster of claim 1 further comprising a tension shoe having a tension surface, and wherein the tension shoe is received in the cavity and the tension shoe surface contacts the prong.

4. The wienie roaster of claim 3 wherein the stalk is threadedly attached to the head by threads at the end of the stalk received by threads in a stalk bore in the head, and wherein the tension shoe has a base opposite the tension surface, and wherein the stalk bore communicates with the cavity allowing the stalk end to contact the base of the tension shoe.

5. The wienie roaster of claim 1 wherein the stalk is threadedly attached to the head by threads at the end of the stalk received by threads in a stalk bore in the head, and wherein the stalk bore communicates with the bore pivotably receiving the prong, and wherein the stalk and has a tip, and further comprising at least one notch in the prong to receive the tip.

6. The wienie roaster of claim 1 further comprising a spring in the cavity, a ball between the spring and the prong, and at least one notch in the prong to receive the ball.

7. A wienie roaster comprising:

an adjustable length stalk with a threaded end, a head with a threaded bore to receive the end of the stalk, a prong, for securing a food item, having a base portion, a prong bore through the head which pivotably receives the base portion of the prong.

8. A wienie roaster comprising:

a stalk with an end, a head at the end of the stalk, the head further comprising a side portion, a bore through the side portion of the head, the bore having at least one oval-shaped opening, the oval-shaped opening having at least one vertex, the vertex being beveled, a prong, for securing a food item, with a base portion, wherein the base portion is pivotably receivede in the bore, and wherein the base portion has at least one curved portion, and wherein the curved portion releasably sits in the beveled vertex of the oval-shaped openin.

9. A weinie roaster comprising:

a stalk with a threaded end, a head with a threaded stalk bore to receive the threaded end of the stalk, the head further comprising a cavity communicating with the stalk bore, a tension shoe having a tension surface and a base, wherein the tension shoe is received in the head cavity and the tension shoe base contacts the end of the stalk, a bore through the head, a prong, for securing a food item, pivotably received in the bore, and wherein the tension surface of the tension shoe contacts the prong.

10. The weinie roaster of claim 9 wherein the bore further comprises an opening with at least one beveled vertex, and wherein the prong further comprises a base with at least one curved portion, and wherein the curved portion is received by the beveled vertex of the opening.

11. A wienie roaster comprising:

a stalk with a threaded end, a head with a threaded head bore to receive the end of the stalk, a prong, for securing a food item, having a base portion with at least one notch, a prong bore through the head which pivotably receives the base portion of the prong, wherein the prong bore communicates with the bead bore, and wherein the threaded end of the stalk extends into the prong bore and releasably receives the notch in the base portion of the prong.

12. The wienie roaster of claim 11 wherein the notch further extends through the prong to form a latching bore to releasably receive the end of the stalk in two positions 180° apart.

13. A wienie roaster comprising:

a stalk with an end, a head at the end of the stalk, a bore through the head, a cavity in the head communicating with the bore, a spring and ball in the cavity, a prong, for securing a food item, pivotably received in the bore, and further comprising a notch, wherein the spring pushes the ball against the prong and is releasably latched in the notch.

\* \* \* \* \*